June 22, 1926.
J. M. ANDERSON
1,589,781
ROTARY TOOL JOINT
Filed Nov. 9, 1925
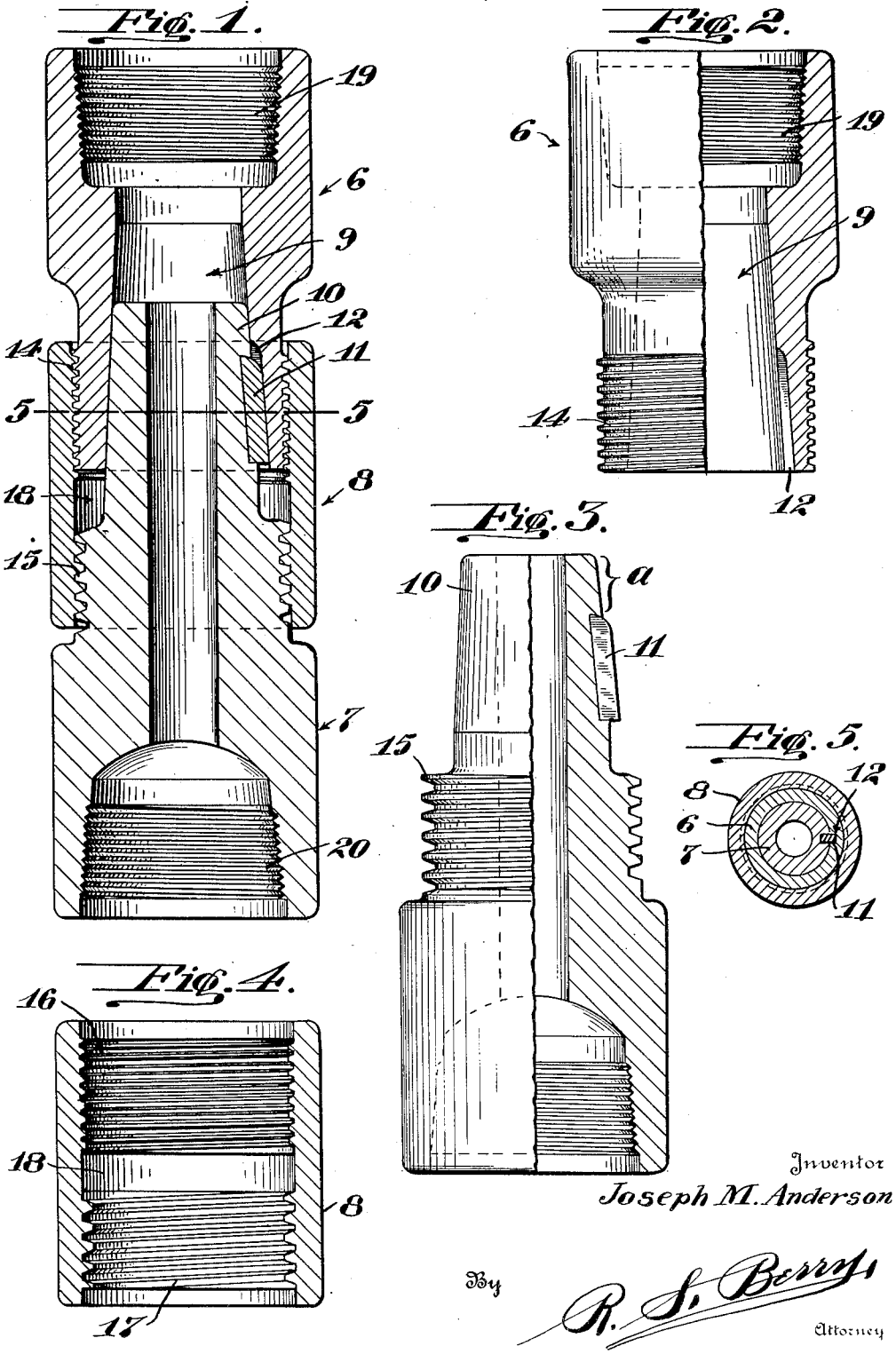
Inventor
Joseph M. Anderson
By R. S. Berry
Attorney Patented June 22, 1926.

1,589,781

UNITED STATES PATENT OFFICE.

JOSEPH M. ANDERSON, OF FELLOWS, CALIFORNIA.

ROTARY TOOL JOINT.

Application filed November 9, 1925. Serial No. 67,865.

This invention relates to couplings generally, and particularly pertains to a tool joint for connecting a drilling tool or bit to a drill rod or pipe.

An object of the invention is to provide a tool joint embodying a pair of connectible and separable elements with means for readily effecting interengagament and disengagement of said elements and in which the parts are so constructed, combined and co-related, as to form a tight interlocking joint which will maintain its interengagement under extreme tension, compression and torsional strains when in service, whereby inadvertent separation of the joint while in operation is obviated.

With the foregoing objects in view, together with such other objects and advantages as may subsequently appear, the invention consists generally in providing a pair of telescoping coupling members one of which is formed with a tapered end portion adapted to extend into a correspondingly tapered end recess in the other member, with a key connection between said members whereby they will be interlocked against rotation in relation to each other, and in providing screw means for effecting the assemblage and separation of said members operable to maintain the coupling members in their interlocked telescoping engagement.

The invention is illustrated by way of example in the accompanying drawings in which:—

Fig. 1 is a view in vertical section of the tool joint showing the coupling members as connected together;

Fig 2 is a view in elevation partly in vertical section of the female coupling member;

Fig. 3 is a view in elevation partly in vertical section of the male coupling member;

Fig. 4 is a detail in vertical section of a threaded sleeve adapted to effect screw engagement with the coupling members shown in Figs. 2 and 3;

Fig. 5 is a detail in cross section on a reduced scale as seen on the line 5—5 of Fig. 1.

Referring to the drawings more specifically, in which like characters of reference designate corresponding parts throughout the several views, 6 indicates a female coupling member, 7 denotes a male coupling member which is adapted to be connected with the member 6, and 8 designates as internally threaded sleeve or collar adapted to be connected with the members 6 and 7.

The coupling member 6 is formed with a tapered bore 9, constituting an end recess which opens to the lower end of the member 6; the walls of which recess converge inwardly with a long slight taper. The coupling member 7 is formed with an externally tapered end extension 10 adapted to be inserted in the bore 9 and having a long slight taper corresponding to that of the walls of the bore 9, so that on telescoping the adjacent end portions of the coupling members, a considerable length of overlap of the members will be effected and a large surface contact between the telescoping portions will result, and whereby on forcing the tapered end portion 10 into the tapered bore 9, a fluid tight joint between the contiguous surfaces of the coupling members will be insured and a long bearing will be effected.

As a means for securely holding the telescoping interconnected coupling members against rotation in relation to each other, a key 11 is mounted on the tapered extension 10 to extend longitudinally thereof, and the bore 9 is formed with a key-way 12 adapted to receive the key 11 to effect interlocking engagement between the coupling members 6 and 7 on positioning the tapered extension 10 within the tapered bore 9, as shown in Fig. 1.

The key 11 is spaced inwardly from the reduced end of the tapered extension 10 so as to afford a wall surface as indicated at $a$ which will project beyond the inner end of the key-way 12 when the coupling is assembled and contact the walls of the bore 9 around the margin of the end of the key-way so as to afford a tight joint and prevent leakage at this point.

The bore 9 has its reduced inner end portion of a diameter slightly less than the diameter of the reduced end of the tapered extension 10 so that on initially employing the coupling members the extension 10 when seated in the bore 9 will not project the length of the tapered portion of the latter, but when the contiguous tapered surface of the bore 9 and extension 10 wear the extension 10 may be projected further into the bore, thus compensating for such wear. In order to permit this advancing of the tapered extension into the bore as wear occurs, the key-way 12 is elongated so that its inner end will normally lie beyond the end of the key 11, thus affording an end clearance that will permit the desired positioning of the extension 10 in the bore 9. The overlapping of the telescoping portions of the coupling is of such length as to provide for space to accommodate a long key so as to minimize any possibility of shearing the latter.

The end portion of the coupling member 6 for encompassing the tapered extension 10 is formed with external screw threads 14, and the coupling member 7 is formed at the base of the tapered extension 10 with external screw threads 15. The threads 14 and 15 lead in corresponding directions and are of differential pitch in relation to each other; the threads 14 being finer and of less pitch than the threads 15. The threads 14 and 15 have their outer peripheries spaced equidistant from the axes of the coupling members, being commonly termed as straight threads.

The sleeve 8 is provided with internal threaded portions 16 and 17 running in corresponding directions, with the threads 16 adapted to screw into engagement with the threads 14 of the coupling member 6 and the threads 17 adapted to screw into engagement with the threads 15 of the coupling member 7. An unthreaded recessed area 18 is provided between the threads 16 and 17 so as to space the threads 16 and 17 apart. The threads 14, 15, 16 and 17 are preferably all right hand threads but may be all left hand threads.

The outer end portions of the coupling members 6 and 7 may be connected in any suitable fashion to whatever structures it is desired to couple together, the coupling members being applicable for use in connecting pipes, rods, shafts, stems and the like, and being here shown as provided with internally threaded end portions 19 and 20 for effecting engagement with the parts to be connected.

The invention as here illustrated is especially designed for use in effecting a connection between a rotary drilling tool or bit and a column of drill pipe in hydraulic rotary systems of well drilling, and for this purpose the coupling members 6 and 7 are formed to afford a passage for liquid therethrough.

In assembling the coupling the sleeve 8 is first screwed onto the coupling member 6 such distance that the threaded end of the coupling 6 will span the unthreaded portion 18 of the sleeve, whereupon the tapered extension 10 is inserted partly into the bore 9 with the key 11 positioned to enter the key-way 12; the tapered extension 10 being of sufficient length relative to the length of the threaded portion 17 of the sleeve that the reduced end of the extension will enter the enlarged outer end portion of the bore 9 a short distance before the lead end of the threads 15 meet the lead ends of the threads 17. The sleeve 8 is then rotated in a direction to retract it on the threads 14 which causes the threads 17 of the sleeve to effect screw engagement with the threads 15 on the coupling member 7; the sleeve 18 retracting on the threads 14, and in turning, causing the threads 15 to feed inwardly into the sleeve 8 by reason of the pitch of the threads 15—17 being greater than the pitch of the threads 14—15. The coupling member 7 is held against rotation relative to the sleeve 8 as the latter is screwed thereon by engagement of the key 11 in the key-way 12. In this manner the tapered end portion 10 may be drawn tightly against the tapered walls of the bore 9; the coarse threads 15—17 effecting rapid advance of the tapered extension 10 into the bore 9 and the fine threads 14—16 being of lesser pitch, serving to give great leverage in drawing the coupling members together.

To effect separation of the coupling the sleeve 8 is turned to advance it on the threads 14 which causes the threads 17 on the sleeve to effect a thrust on the coupling member 7 to pull the tapered extension 10 out of engagement with the bore 9.

By employing the construction herein set forth rapid connection and disconnection of the coupling members may be easily effected.

I claim:—

A rotary tool joint comprising a coupling member, an elongated tapered extension on said coupling member, a key carried by said extension, a second coupling member formed with a tapered bore to telescopically receive said tapered extension, a key-way in said bore to receive said key; each of said coupling members being provided with an externally threaded portion, the threads on one of said coupling members being of less pitch than the threads on the other coupling member, and the threads on both coupling members extending in like directions, and a sleeve having internally threaded portions adapted to screw in engagement with the threaded portions of said coupling members; said sleeve being screwed on and carried by the coupling member having the threads of greater pitch and operable on insertion of the tapered extension of one coupling member into the bore of the other coupling member to effect engagement with the threaded portion on the first named coupling member on rotating the sleeve to retract it on the threads of lesser pitch.

In testimony whereof I have affixed my signature.

JOSEPH M. ANDERSON.